United States Patent [19]

Garney

[11] Patent Number: 5,470,557
[45] Date of Patent: Nov. 28, 1995

[54] ZEOLITES

[75] Inventor: Bryan W. Garney, Reading, England

[73] Assignee: The Secretary of State for Defence in Her Britannic Majesty's Government of the United Kingdom of Great Britain and Northern Ireland, London, England

[21] Appl. No.: 934,484

[22] PCT Filed: May 17, 1991

[86] PCT No.: PCT/GB91/00781
§ 371 Date: Sep. 15, 1992
§ 102(e) Date: Sep. 15, 1992

[87] PCT Pub. No.: WO91/17955
PCT Pub. Date: Nov. 28, 1991

[30] Foreign Application Priority Data

May 18, 1990 [GB] United Kingdom ............... 9011151

[51] Int. Cl.$^6$ .............................. C01B 5/02; C01B 6/34; C01B 33/26
[52] U.S. Cl. .................. 423/249; 423/328.2; 423/332; 423/580.1; 423/580.2; 376/314; 976/DIG. 267; 95/117; 95/210; 95/139; 210/689; 502/407; 502/414; 502/415
[58] Field of Search ............... 423/328.2, 332, 423/210, 249, 580.1, 580.2; 502/641, 407, 414, 415; 55/68, 74; 976/DIG. 378, DIG. 267; 376/314; 95/117

[56] References Cited

U.S. PATENT DOCUMENTS

| | | | |
|---|---|---|---|
| 3,056,653 | 10/1962 | Slayter | 423/328.2 |
| 3,252,757 | 5/1966 | Granquist | 423/328.2 |
| 3,676,366 | 7/1972 | Podschus et al. | |
| 3,703,797 | 11/1972 | Lepold et al. | 55/62 |
| 3,760,662 | 9/1973 | Sand et al. | 423/700 |
| 3,848,067 | 11/1974 | Cooper | 976/DIG. 378 |
| 3,963,511 | 6/1976 | Swift et al. | 106/469 |
| 4,016,246 | 4/1977 | Whittam | 423/711 |
| 5,173,463 | 12/1992 | Macedo | 502/63 |

FOREIGN PATENT DOCUMENTS 2917460  11/1979  Germany.

OTHER PUBLICATIONS

J. F. Charnell, J. Cryst. Growth (1971) 8, 291–294.

Todorovic, M. and Radak–Jovanovic, Colloids and Surfaces, 23, pp. 345–351 (1987) "The Release of Tritiated Water From Synthetic Analcime Into Surrounding Water".

Todorovic, M., Gal, I. J., and Brucher, H., Radioactive Waste Management and the Nuclear Fuel Cycle, V.8(4), pp. 339–346 (1987), "The Exchange of Tritiated Water Between Natural Zeolite Analcime and Surrounding Water".

Primary Examiner—Anthony McFarlane
Attorney, Agent, or Firm—Nixon & Vanderhye

[57] ABSTRACT

Crystals of the Zeolite Analcime (Analcite) $Na_2O.Al_2O_3.4SiO_2.2H_2O$ are provided having a largest dimension greater than 50 micron. A method for preparing such crystals by mixing aqueous solutions of aluminium sulphate and sodium metasilicate, allowing a gel to form then heating, is provided. The presence of an organic water-miscible base encourages an increased crystal size. The crystals retain water strongly and a use for them in long term immobilisation of tritiated waste water is provided.

17 Claims, 4 Drawing Sheets

1
ZEOLITES

This invention relates to a novel form of the Zeolite Analcime (also known as Analcite), to a novel method for preparation of this, and to a use for the said novel form of Analcime.

BACKGROUND OF THE INVENTION

Zeolites are crystalline aluminosilicates of Group IA and IIA whose empirical formulae can be written as:

$$M_{2/n}O.Al_2O_3.xSiO_2.y\ H_2O$$

where n is the cation charge and x and y are the number of $SiO_2$ and $H_2O$ entities respectively. There are approximately 40 natural mineral Zeolites and over 150 synthetic types known. These are complex crystalline inorganic polymers based on an tetrahedral network in which $Al^{3+}$ and $Si^{4+}$ are connected by oxygen in such a way that each is bonded to four oxygen atoms. The substitution of aluminium for silicon produces a deficiency in electrical charge that must be locally neutralised by the presence of an additional positive ion (eg $Na^+$) within the interstices of the structure. This framework structure contains channels or interconnected voids that are occupied by the cation and water molecules. The cations are mobile and can undergo ion exchange. The water may be removed reversibly, which leaves intact a crystalline host structure permeated by micropores which may account for up to 50% of the volume and which can trap molecules of a size comparable with the size of the micropores, and in this way Zeolites may be used to absorb small molecules such as water, ethanol etc.

The ease with which such molecules can enter and leave the micropores depends *inter alia* on the characteristics of the Zeolite. For example if the micropores are 'one dimensional' ie in the form of non-intersecting tunnels through the lattice, movement of the molecules into and out of the Zeolite will be restricted. If the pore apertures approximate to the size of the molecules then again such movement of the molecules will be restricted.

One mechanism by which absorbed molecules may be lost from the Zeolite is that of their exchange with molecules in the environment. The rate or exchange may be expressed in terms of a hair-life (T½), the time in which hair of the absorbed molecules will exchange. It can be shown that T½ is proportional to the square of the radius (r) of the Zeolite crystallite, ie for a long T½ a large r is required.

The ability of Zeolites to absorb and retain molecules is exploited in various ways industrially, for example as 'molecular sieves' to selectively absorb certain molecules on the basis of size, especially absorption of water in drying processes. One potentially important application of water-absorbing Zeolites is in the nuclear industry, in the disposal of waste water containing radioactive tritium oxide $T_2O$. $T_2O$ cannot be allowed to enter and pollute the environment on any significant scale, and consequently waste water containing $T_2O$ must be stored until the tritium has decayed to an extent that its radioactivity is no longer a problem.

As solids are more convenient to store than liquids, it is preferred to convert such waste water into solids. One known method of doing this, used at present, is to absorb this water into a Zeolite. The Zeolite most widely used for $T_2O$ storage is Zeolite 4A, having a 4A° micropore aperture and a formula $Na_2O.Al_2O_3.2SiO_2.4.5H2O$. Zeolite 4A has the advantage of a high water storage capacity (about 25% by weight) and low vapour pressure of absorbed water. Zeolite 4A has a major disadvantage that water absorbed in the Zeolite rapidly exchanges with environmental water. In the event of a breach of containment, thereby exposing $T_2O$ loaded Zeolite 4A to water, relatively rapid loss to the environment would occur. Typically T½ for exchange of water absorbed in Zeolite 4A with environmental water is 2–3 hours.

Zeolites having a longer T½ would clearly be useful in reducing the possibility of release of $T_2O$, or even of avoiding the need for a sophisticated container if the Zeolite could be dumped (in conformity with environmental legislation), for example in the sea. As the radioactive decay half-life of tritium is 12.3 years, a T½ measured in years would be highly desirable.

Among other known but little studied (as regards $T_2O$/$H_2O$ exchange) Zeolites is Analcime. The formula of Analcime is normally expressed as $Na_2O.Al_2O_3.\ 4SiO_2.2H_2O$, but quite large variations are possible without substantially changing the crystal structure, eg the $SiO_2/Al_2O_3$ ratio can very between 3.6 to 5.6 (D. W. Breck, Zeolite Molecular Sieves, Wiley, 1974). Analcime is not yet commercially available but methods of synthesis have been known for a long time.

The structure of Analcime is very constricted; the basic $SiO_4$ and $AlO_4$ tetrehedra mutually link to form 4 or 6 membered rings. The framework encompasses 16 cavities which form continuous non-intersecting channels with a pore aperture diameter of around 2.4A°, ie comparable with the diameter of a water molecule (ca. 2.6A°). Analcime is known to retain about 9% by weight of water.

A fundamental problem with Analcime however is that no previously known synthesis method has been able to consistently produce Analcime in a crystal size larger than about 50 microns and most of the more convenient methods result in Analcime of a crystal size in the 10–20 micron range. Experiments on Analcime at a crystal size of 13 microns indicate a T½ for water exchange of about 2 years. Although this is clearly an advance on Zeolite 4A it still leaves room for improvement.

A method for producing larger crystals of Zeolites of formula A, $(Na_2O.Al_2O_3.2SiO_2.XH_2O)$ and formula X $(Na_2O.Al_2O_3.2.8SiO_2.XH_2O)$ is described by J. F. Charnell, J Cryst. Growth. (1971) 8 291–294. This method uses a low temperature (75°–85° C.) and a significant amount of time (2–5 weeks) and produces crystals of X having a maximum crystal size about 140 microns, but for A only about 60 microns.

It is an object of this invention to provide Analcime in a larger crystal size than has been hitherto available with the aim of providing increased half-life of water exchange. Other objects and advantages of this invention will be apparent from the account below.

Figure 1:
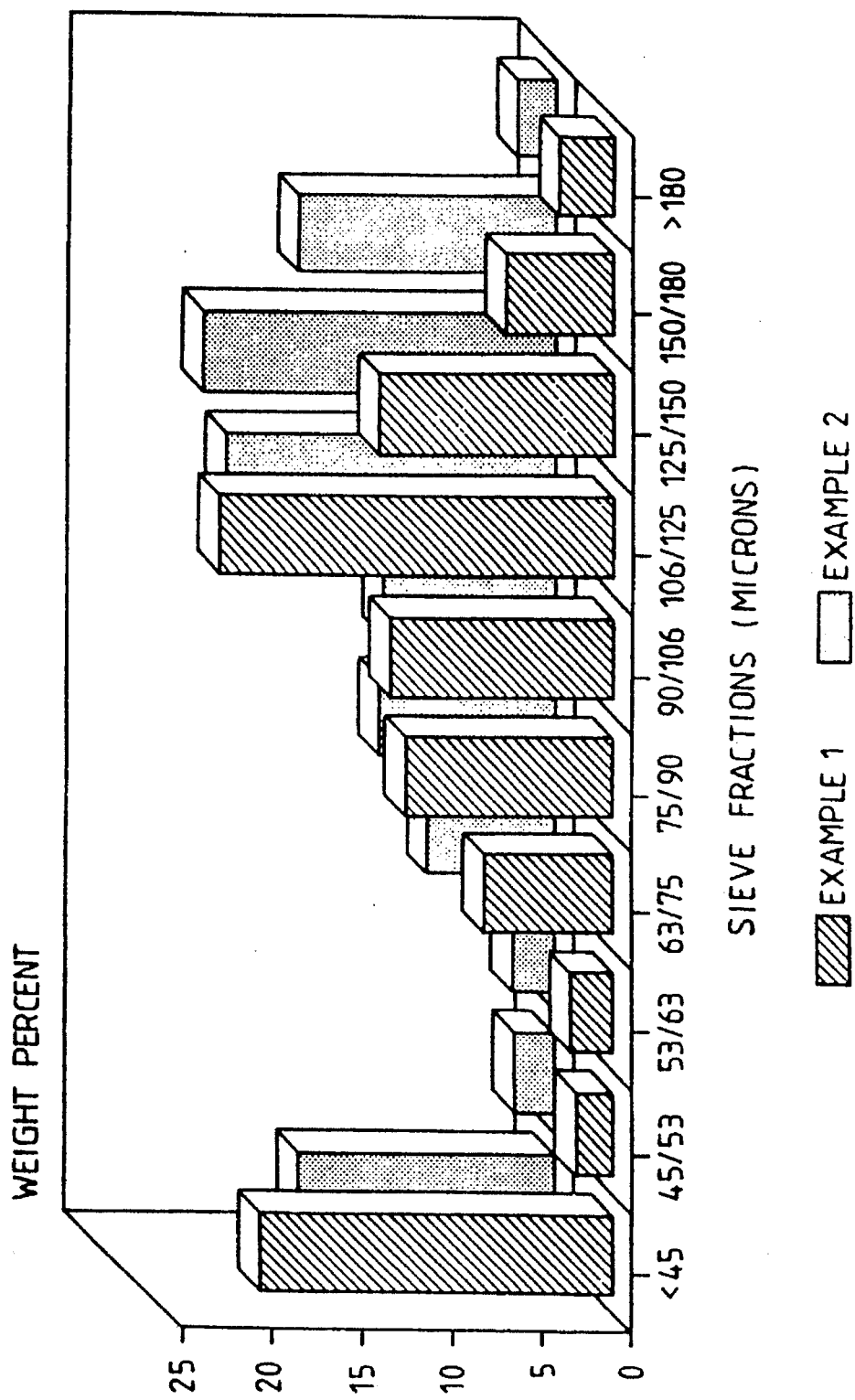
FIG. 1 is a histogram showing size distribution of Analcime crystals made by Examples 1 and 2.

According to the present invention Analcime is provided as crystals having a largest dimension greater than 50 microns.

The preferences expressed below are on the basis of ease of preparation and suitability for long term water retention.

Preferred Analcime crystals have a largest dimension greater than 60 microns. e.g. 60–180 microns especially 70–180 microns, more preferably 90–150 microns, most preferably 106–150 microns. Analcime is known to crystalline as spherulites and polyhedra depending on the synthesis conditions and both forms are envisaged as having utility for tritiated water retention.

The invention also provides a method for preparing such crystals comprising the steps of:

(a) preparing an alkaline aqueous solution containing aluminium sulphate and sodium metasilicate, the ratio of sodium, aluminium and silicon in the solution being such that when expressed as mole ratios $Na_2O:Al_2O_3:SiO_2$, this ratio is in the range 3 to 7:1:3 to 7.

(b) allowing the solution to gel, (c) heating the gel to 90°–250° C.

In a further method of the invention the alkaline aqueous solution of step (a) may also comprise a water-miscible organic base, particularly triethanolamine but other bases such as others suggested by Charnell may also be selected on the basis of simple bench experimentation. Preferably the solution is prepared by mixing separate aqueous solutions being a solution of aluminium sulphate and a solution sodium metasilicate, the latter also containing the base if present.

It is preferred that both solutions are filtered prior to mixing to remove nuclei which might cause heterogeneous nucleation. For example a 0.7 micron filter such as a Whatman GF/F glass microfibre filter is suitable. Preferably the solutions are mixed cold ie. around room temperature or below, optimally at 20° C. and preferably the solutions are poured simultaneously into a vessel and stirred only for a few seconds.

Preferred $Na_2O:Al_2O_3:SiO_2$ mole ratios are of range 4 to 6: 1: 4 to 6, an optimum apparently being 4.5:1:4.5. The presence of an organic water-miscible base, in particular triethanolamine $N(CH_2CH_2OH)_3$ is found to increase the formation of larger crystals.

The function of the organic base in this method is not fully understood. The amount of triethanolamine used is preferably in the range 1:2.1–9.1 $Al_2O_3$:triethanolamine but increasing the mole ratio $SiO_2$:triethanolamine above 4.5:6.15 leads to immiscibility problems with the metasilicate solution, hence this proportion of triethanolamine appears to be optimum.

Consequently a preferred optimum composition for the mixture expressed as above appears to be $Na_2O(4.5):Al_2O_3(1):SiO_2(4.5)$: triethanolamine (6.15).

It is preferred that the $Al_2O_3:H_2O$ mole ratio is 1:300 or more, preferably 1:300 or more, optimally about 1:380 for the optimum composition referred to above. At higher mole ratios of $Al_2O_3:H_2O$ above this optimum the volume ratio of water to solids can become inconveniently large.

Under the conditions outlined above a gel forms instantaneously. Heating should be carried out in a sealed vessel with an inert lining (eg PTFE or stainless steel) to avoid corrosion of the vessel and contamination of the product. The temperature is preferably held at 150° C. or above to ensure the crystallisation of Analcime. The rate of crystallisation increases with temperature. An optimum appears to be around 200° C., e.g. 190°–210° C. and a duration 16–48 hours at this temperature is preferred. After this heating and subsequent cooling to ambient temperature the crystals should be filtered from the liquor, washed with demineralised water and dried, eg. at about 100° C.

The method above produces Analcime crystals in a mixture of spherulite and polyhedral morphology having a size distribution curve peaking at a maximum as described above.

Analcime crystals having a largest dimension of 70 microns would be expected to have a T½ of approximately 50 years which would be very useful for retention of tritiated water. For this use it is desirable to remove smaller crystals as tritiated water would be retained less strongly in these. The method of the invention yields a product in form of agglomerates of larger and smaller crystals. These may be separated mechanically, by ball milling. A preferred method of mechanical separation of large from small crystals is by exposure to ultrasonic vibration, for example by suspension in a medium such as ethanol:water (eg 1:10) and exposure to said vibration for about 3 hours. After ultrasonic treatment the product may be washed to remove fines (ie. 20 microns or smaller), filtered and dried in hot air (eg 100° C.) then sieved on graduated sieves to select the desired size distribution.

To enable Analcime product obtained as above to absorb water it is necessary to dehydrate the crystals. ie to drive out water already held in the micropores. This is best done by heating the product to 250°–350° C. in a purge of hot air. After 1 hour of such heating most of the ca 9.0 wt% of held water is driven out.

To complete the dehydration process the temperature may then be raised to 600° C. and maintained at this level for a suitable period, eg from 16 to 24 hours or longer as desired.

These Analcime crystals may be used to absorb and retain tritiated water in their as-prepared crystalline form. Alternatively chemically modified forms may be prepared in which at least a proportion of the sodium ions are replaced with cobalt II by ion exchange. It will be realised that the crystals provided by the present invention may be used to immobilise all isotopic forms of water whether as ($H_2O$), deuterated water ($D_2O$) and/or as tritiated water ($T_2O$).

Ion exchange may be achieved with hydrated Analcime. The Analcime is heated with aqueous cobalt ion, eg $CoCl_2$ solution at 60°–250° C., preferably 200° C. for a suitable period, eg from 8 hours to 2 days, then replacing the solution and repeating this process until the required amount of cobalt has entered the crystals. The crystals are then filtered, washed with demineralised water and dried, eg at 100° C.

This cobalt-exchanged Analcime may then be dehydrated by heating, preferably in nitrogen at around 250° C. These crystals are pink when hydrated and blue when dehydrated. The cobalt exchanged Analcime is extrapolated to have an increased water capacity and a reduced rate of water exchange, and thus tritiated water exchange, leading to an increased T½. By similar methods sodium may be substituted by other cations, eg lithium or potassium, to increase the water capacity or T½, The invention provides a method for the immobilisation of water ($H_2O$) and/or its radioisotope containing forms, ie. water partly or entirely comprising deuterium oxide ($D_2O$) and/or tritium oxide ($T_2O$), in which the $H_2O$, $D_2O$ and/or $T_2O$ is absorbed into Analcime crystals having a largest dimension greater than 50 microns. The crystals may be discete crystals or may be embedded in a larger body, eg. a pellet comprising a water porous binder matrix.

Preferably these crystals have a largest dimension greater than 60 microns, e.g. 60–180 microns, especially 70–180 microns, more preferably 90–150 microns, most preferably 106–150 microns. The T½ for T$_2$O exchange of such crystals is extrapolated to be measured in years due to its strong retention, and consequently release of radioactivity is likely to be minimal.

Prior to loading with the water, eg that comprising waste T$_2$O, the Analcime is preferably freshly dehydrated, eg by heating to 400°–500° C. for at least 2 hours in dry nitrogen, to remove residual water from the micropores. The Analcime is then mixed with a maximum of 8.0 wt% of the T$_2$O containing water in a pressure vessel and is then heated. The heating temperature is preferably at least 150°–200° C. but a minimum temperature of 200° C. is preferred for absorption of the water in a convenient time. At these temperatures 1–4 days of heating is suitable for absorption to be effectively complete. On cooling to ambient temperature the tritiated water is found to be absorbed.

The T½ of this product is so long that it may be used as a permanent store for tritiated waste water, preferably below 25° C. Any subsequent accidental exposure of this material (when loaded with T$_2$O) with environmental water would result in very slow rates of isotopic exchange and minimal environmental hazard.

This invention will now be described by way of illustration only with reference to the following figures, tables and examples, further embodiments will occur to a man skilled in the art in the course of assessment of the materials and methods for particular use.

DESCRIPTION OF THE PREFERRED EMBODIMENTS

1. PREPARATION OF CRYSTALS

EXAMPLE 1

Solution A
162.8 g aluminium sulphate Al$_2$(SO$_4$)$_3$.16H$_2$O.
Made up to 1 litre with demineralised water.
Solution B
275.0 g sodium metasilicate (Na$_2$SiO$_3$.5H$_2$O).
Made up to 1 litre with demineralised water.

The solutions were made by first dissolving the reagents in 600 mls of water by heating and stirring. The solutions were then transferred to 1 litre volumetric flasks and allowed to cool before adjusting the volume to 1 litre. Each solution was then filtered using a 0.7 micron Whatman GF/F glass microfibre filter and stored in polythene bottles. 60 mls of solution A and 54 mls of solution B were poured simultaneously into the PTFE liner of a 150 ml pressure Vessel. The mixture was then stirred gently for a few seconds until it became more viscous. The pressure vessel was then heated in an oven at 200° C. for 24 hours. After cooling, the crystals were filtered from the solution, washed and dried at 100° C.

The mole ratio of reagents in this example was:

Na$_2$O(4.5):Al$_2$O$_3$(1):SiO$_2$(4.5):H$_2$O(403).

EXAMPLE 2

Solution A
162.83 g aluminium sulphate Al$_2$(SO$_4$)$_3$.16H$_2$O
Made up to 1 litre with demineralised water.
Solution B
275.0 g sodium metasilicate (Na$_2$SiO$_3$.5H$_2$O)
200 mls triethanolamine N (C$_2$H$_3$OH)$_3$.
Made up to 1 litre with demineralised water.

The procedure is as described for Example 1. The mole ratios in this instance are:

Na$_2$O(4.5):Al$_2$O$_3$(1):SiO$_2$(4.5):H$_2$O(380):triethanolamine (6.15).

The crystal size distribution resulting from these two Examples are tabulated in Tables 1 and 2 below and shown in histogram in FIG. 1.

Figure 2:
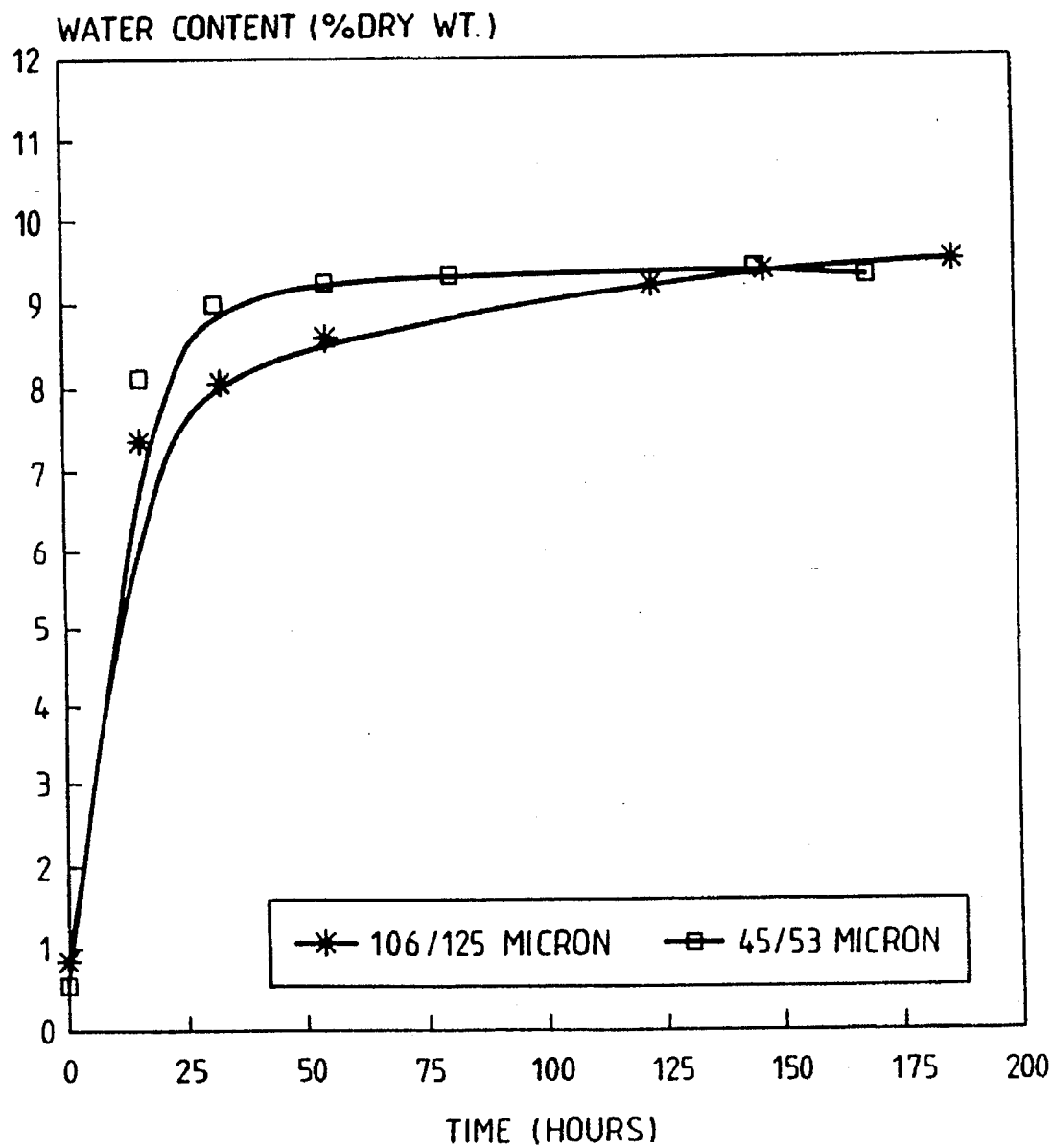
FIG. 2 is a graph showing the water absorption of the crystals made by Example 1.

2. DE-AGGLOMERATION OF CRYSTALS 85 g of crude Analcime from Example 1 above was added to 250 mls of 10% ethanol in water, and was immersed in a 150 watt ultrasonic bath for 3 hours. This was found to separate large from small crystals in the aggregates. After washing to remove fines and filtering, the material was dried and sieved to produce the different size fractions. Photographs of material made by Example 1 are shown in FIG. 2.

3. DEHYDRATION

The de-agglomerated Analcime crystals were heated to 300° C. in a purge of hot air. This was continued for 1 hour during which most of the water (ca 9.0% by weight) was removed. The temperature was then raised to 600° C. for 16–24 hours before then cooling to ambient.

4. ION EXCHANGE WITH COBALT 10 gms of Analcime +50 mls of 1 M cobalt chloride solution were heated at 200° C. for 3 days. The solution was then drained off and replaced with 50 ml of cobalt chloride solution. The procedure was repeated until the required amount of cobalt had entered the crystals. The crystals were filtered from the cobalt chloride solution washed with distilled water and dried at 100° C. The crystals were dehydrated by heating to 250° C. in a stream of N$_2$ and are blue when anhydrous and pink when hydrated.

WATER ABSORPTION BY ANALCIME 5 g of dried Analcime was sealed in a stainless steel tube with an excess (10 mls) of water. The tube was 11 ins. long by 0.5 ins. OD with a wall thickness of 0.48 ins. permanently sealed at one end with a 0.5 ins. Swagelok fitting and the other end having a demountable 0.5 ins. Cajon joint. The sealed tube was heated in an oven at 200° C. At various time intervals the tube was cooled, opened and the Analcime separated from the excess water by filtering through a glass sinter. The Analcime was then washed with dry acetone and dried in an oven at 40° C. A small aliquot was removed for thermogravimetric water analysis and the remainder resealed in the pressure tube with another portion of water.

Figure 3:
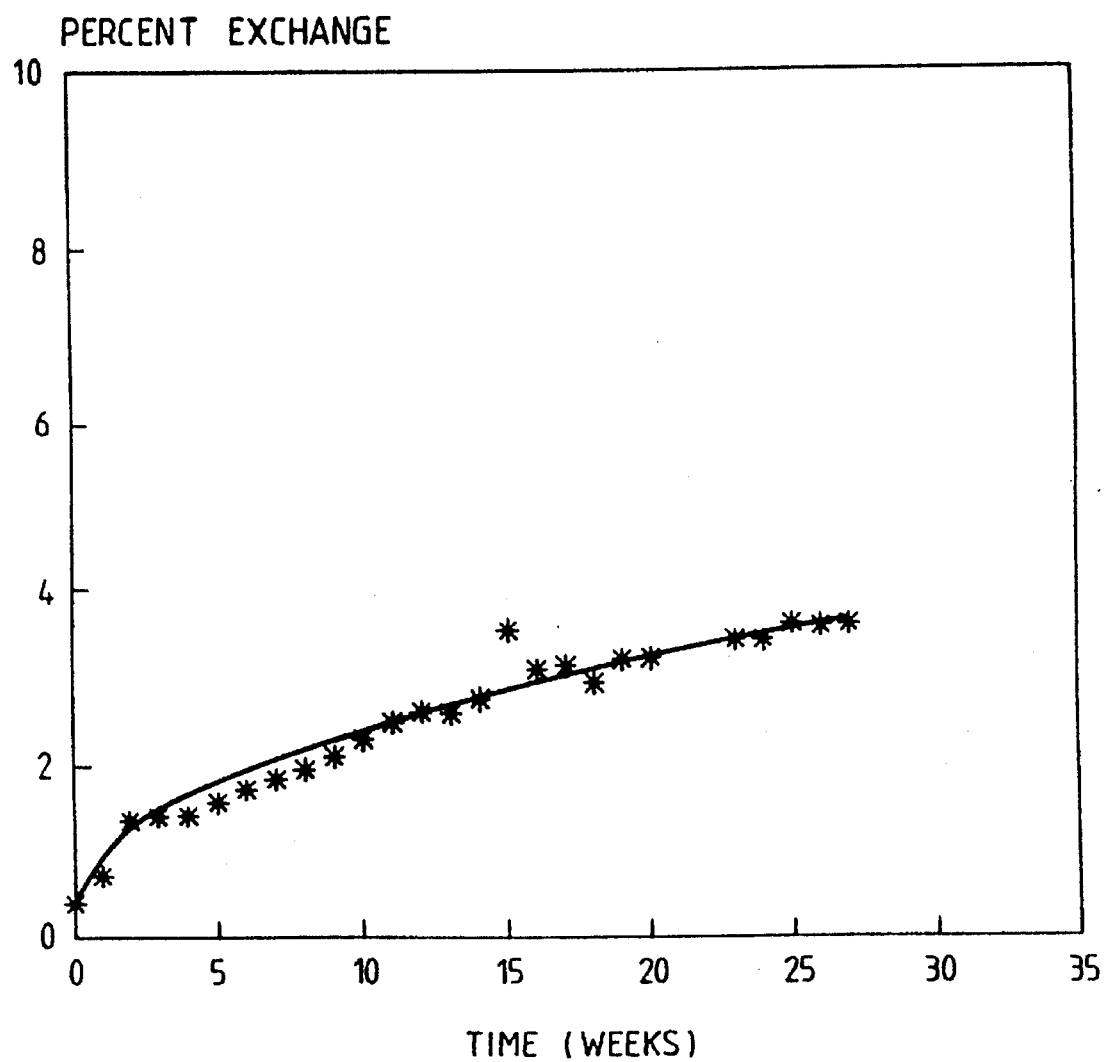
FIG. 3 is a graph showing $T_2O$ loss from the Analcime crystals made by Example 1.

The results for $^{45}/_{53}$ and $^{106}/_{125}$ micron diameter Analcime at 200° C. are shown in FIG. 3. Approximately 8.0 wt % can be absorbed in one to two days, but the full 9.0 wt % could take as long as 6 days at 200° C.

5. T$_2$O/H$_2$O EXCHANGE

Several batches of Analcime, prepared using the method of Example 1, were mixed and then sieved to separate fractions in the size range $^{45}/_{53}$, $^{63}/_{75}$ and $^{106}/_{125}$ microns diameter. The material was dehydrated by heating to 500° C. for 16 hours, then cooled to room temperature.

Samples of about 3 g were then sealed in stainless steel tubes with known weights of tritiated water. The weight of water was calculated to give a loading of 8.0 wt % tritiated water. The sealed tubes were then heated to 200° C. for 3 days to allow absorption. After cooling and removal from the steel tubes, a sample of the Analcime was dissolved in excess dilute hydrochloric acid. The acid destroys the Zeolite framework and allows the absorbed tritiated water to equilibrate with the acid solution and the total quantity of absorbed tritiated water can then be determined by a scintillation counting method.

Figure 4:
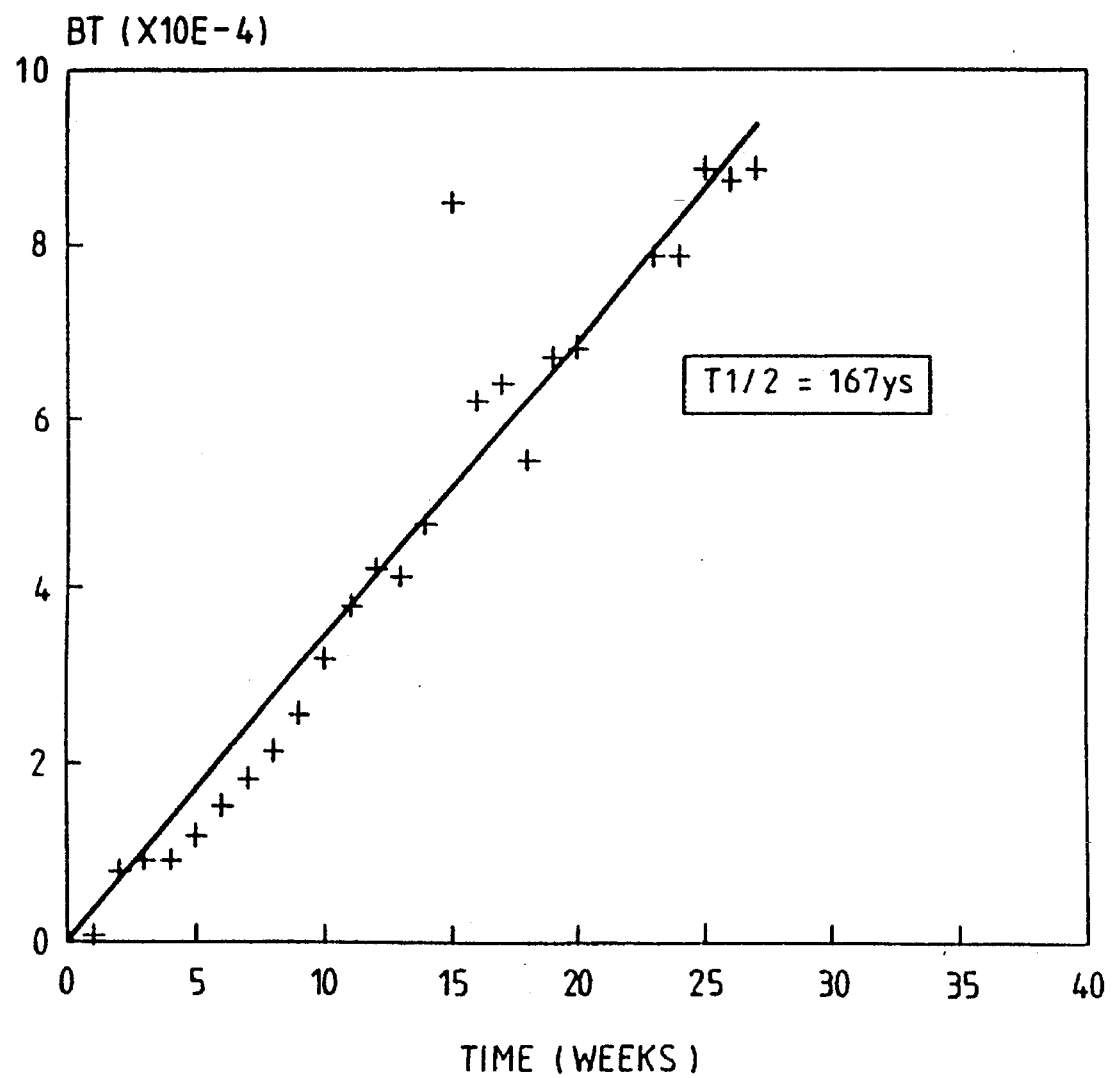
FIG. 4 is a graph showing the data applied to a diffusion model in which a half-life for $T_2O$ exchange of 167 years is plotted.

Samples (0.5 g) of the remaining $T_2O$ loaded Analcime were placed in sealed bottles containing 150 mls of water. The bottles were stored in a thermostatic bath at 25° C. At weekly intervals, aliquots of the water was removed and the tritium concentration determined by scintillation counting. The results, showing the loss of $T_2O$ from the $106/125$ micron Analcime are shown in FIG. 4. The data can be fitted to the diffusion model proposed by Boyd, Adamson and Myers (Ref. J Am. Chem. Soc. 75(1953)589 D. Reichenberg)

$$F = 1 - \frac{6}{\pi^2} \sum_{n=1}^{\infty} \frac{e^{-n^2 Bt}}{n^2}$$

where F=fractional exchange and $$B = \frac{D\pi^2}{r^2}$$

where
D=diffusion coefficient
r=radius of crystal
n=integer

The half-life of exchange can be calculated from the slope of the plot of Bt vs t because it can be shown that $$t1/2 = \frac{0.301}{B} \quad (t1/2 = T1/2 \text{ in text})$$

The diffusion model data is shown in FIG. 5. The T½ of water exchange is calculated to be 167 years from this.

COMPARATIVE EXAMPLE

Analcime particles of greater than 50 microns but comprising multiple crystallite forms of smaller dimension having porous regions between them were prepared by the following technique.

Solution A 3.5 g aluminium wire (99.9% pure) was added to 10.3 g sodium hydroxide dissolved in 75 ml water in a polypropylene vessel. On completion of dissolution 37.5 ml triethanolamine was added and the solution made up to 250 ml with water.

Solution B

Sodium metasilicate was dissolved in 150 ml water in a propylene vessel, the triethanolamine was added and the solution was made up to 250 ml with water.

Method

Both solutions were heated on a steam bath and filtered hot using a 2 micron polyvinylidene difluoride membrane filter (Millipore). Both solutions were allowed to cool to room temperature, then solution A was poured into solution B with gentle stirring using a PTFE rod. The resulting gel was poured into a PTFE lined autoclave and heated at 200° C. for 2 days. The crystals were washed free of excess alkali with water. The product was then dried by heating in air at around 100° C.

The mole ratio of reagents in this example was:

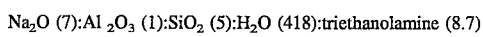

$D_2O/H_2O$ exchange:

Isotopic exchange of a $106/125$ micron particle fraction prepared from the above product by the previously described de-agglomeration method were loaded with 96% $D_2O$ and it's exchange T½ with $H_2O$ was measured between 40° C. and 90° C. Extrapolation of exchange to 25° C. gives half-lives of T½ of only 250 and 350 days for the Analcime in contact with gaseous and liquid water respectively.

PELLETISATION:

Suitable absorptive bodies comprising the crystals of the invention are made by pelletizing which provides a conveniently handled, non-particulate form. Dry crystals or their powder may be mixed with eg. Kaolin (ca. 15 wt. %) and water, compressing the mixture and moulding, drying and then firing it at high temperature. Alternatively the Analcime may be mixed with kaolin and a suitable binder such as polyvinyl alcohol (PVA), the mixture extruded, cut into pellets, dried then fired at high temperature. In each case drying may be in air at ambient temperature for 24 hours, then for about 16 hours at about 110° C. Firing is conveniently at between 250° C. to 650° C. These pellets may be strong but may have a tendency to self-abrade resulting in dust. Case hardening of the pellets by immersion in sodium silicate solution followed by drying and firing reduces this feature. Such pelletised Analcime is very porous with void volumes of between about 35 and 55%.

EXAMPLE 3

PRESSING

Analcime (79.4 wt %) and clay (15.1 wt % kaolin (BDH)) were dry mixed, water (5.5 wt %) was then added and 0.75 g of the resulting powder was added to a 13 mm dia. I.R. die and pressed to 2 tons force. The pellets were air dried for 24 hours then dried overnight at 100° C. Heating at 250° C. for 1 hour was followed by a further hour at 450° C. and yet a further hour at 650° C. before cooling slowly under dry nitrogen.

EXAMPLE 4

EXTRUDING

Analcime (51.0 wt %) and kaolin (9.0 wt %) were dry mixed for 1 hour before adding a solution of polyvinyl alcohol (40.0 wt % with 5 wt % wallpaper paste), The PVA solution gelled and prevents water loss caking the mixture while it was extruded through a 3 mm nozzle, Rods were air dried for 24 hours then cut to size before being subject to the 250° C., 450° C. and 650° C. heating described in Example 3. Both forms are case hardened by heating dried 10% sodium silicate at 450° C. for 1 hr.

TABLE 1

(METHOD 1)

| Batch | Crude Wt % | Grams Wt. in each size fraction in microns | | | | | | | | |
|---|---|---|---|---|---|---|---|---|---|---|
| | | <45 | 45–53 | 53–63 | 63–75 | 75–90 | 90–106 | 106–125 | 125–150 | 150–180 | >180 |
| 1 | 6.93 | 1.70 | 0.09 | 0.07 | 0.30 | 0.48 | 0.61 | 1.19 | 1.11 | 0.68 | 0.68 |
| 2 | 7.37 | 1.02 | 0.07 | 0.06 | 0.32 | 0.81 | 1.16 | 2.09 | 1.27 | 0.46 | 0.09 |
| 3 | 7.36 | 0.95 | 0.16 | 0.16 | 0.50 | 0.98 | 0.91 | 1.88 | 1.12 | 0.51 | 0.17 |
| 4 | 7.37 | 1.93 | 0.13 | 0.13 | 0.40 | 0.80 | 0.97 | 1.46 | 0.90 | 0.45 | 0.17 |
| 5 | 7.45 | 1.57 | 0.31 | 0.46 | 1.11 | 1.18 | 0.91 | 1.40 | 0.37 | 0.12 | 0.02 |
| TOTAL | 36.48 | 7.17 | 0.76 | 0.88 | 2.63 | 4.25 | 4.56 | 8.02 | 4.77 | 2.22 | 1.13 |
| AVERAGE OF FIVE BATCHES wt % | | | | | | | | | | | |
| | 7.30 | 19.45 | 2.08 | 2.41 | 7.21 | 11.65 | 12.50 | 21.98 | 13.08 | 6.09 | 3.10 |

$$\text{PRODUCT YIELD} = \frac{\text{Wt. of material} > 53 \text{ microns}}{\text{Wt. of crude product}} \times 100 = 78.47\%$$

TABLE 2

(METHOD 2)

| Batch | Crude Wt % | Grams Wt. in each size fraction in microns | | | | | | | | |
|---|---|---|---|---|---|---|---|---|---|---|
| | | <45 | 45–53 | 53–63 | 63–75 | 75–90 | 90–106 | 106–125 | 125–150 | 150–180 | >180 |
| 1 | 7.17 | 0.99 | 0.14 | 0.15 | 0.40 | 0.61 | 0.62 | 1.39 | 1.59 | 1.26 | 0.1 |
| 2 | 7.18 | 0.53 | 0.10 | 0.10 | 0.35 | 0.52 | 0.61 | 1.62 | 2.25 | 1.05 | 0.1 |
| 3 | 7.23 | 1.36 | 0.15 | 0.13 | 0.35 | 0.64 | 0.66 | 1.28 | 1.30 | 1.15 | 0.2 |
| 4 | 7.18 | 1.41 | 0.22 | 0.21 | 0.63 | 0.67 | 0.64 | 0.98 | 0.93 | 1.15 | 0.3 |
| 5 | 7.29 | 0.85 | 0.21 | 0.29 | 0.83 | 1.11 | 0.93 | 1.34 | 1.03 | 0.57 | 0.1 |
| TOTAL | 36.05 | 5.14 | 0.82 | 0.88 | 2.56 | 3.55 | 3.46 | 6.61 | 7.10 | 5.18 | 0.80 |
| AVERAGE OF FIVE BATCHES wt % | | | | | | | | | | | |
| | 7.21 | 14.26 | 2.27 | 2.44 | 7.10 | 9.85 | 9.60 | 18.34 | 19.39 | 14.37 | 2.22 |

$$\text{PRODUCT YIELD} = \frac{\text{Wt. of material} > 53 \text{ microns}}{\text{Wt. of crude product}} \times 100 = 78.47\%$$

I claim:

1. Analcime crystals having their largest dimension greater than 106 microns and including a fraction of crystals of largest dimension between 106 and 180 microns, wherein a fraction of largest dimension between 106 and 125 microns when containing $T_2O$ and placed in water, has a half-life of exchange of the $T_2O$ with the water of about 167 years.

2. Analcime crystals as claimed in claim 1 wherein their largest dimension is from 106 to 180 microns.

3. Analcime crystals as claimed in claim 1 wherein their largest dimension is from 106 to 125 microns and, when containing $T_2O$ and placed in water, their half-life of exchange of the $T_2O$ the water is 167 years or more.

4. A body comprising Analcime crystals according to claim 1 wherein the Analcime crystals are embedded in a water porous binder matrix.

5. The body according to claim 4 wherein the binder matrix comprises fired kaolin/water mix or kaolin/polyvinyl alcohol mix.

6. The body according to claim 4 wherein the binder matrix embedded Analcime crystals have a dried and fired sodium silicate case hardening.

7. Analcime crystals having their largest dimension greater than 106 microns, the crystals being substantially free of porous regions.

8. Analcime crystals according to claim 7, wherein a fraction of crystals of largest dimension between 106 and 125 microns which, when containing $T_2O$ and placed in water, has a half-life of exchange of $T_2O$ with the water of about 167 years.

9. Analcime crystals according to claim 1 or 7 wherein at least a proportion of the Analcime metal ions are cations capable of increasing the Analcime crystals' water capacity and/or increasing half-life of exchange of $T_2O$ with water when $T_2O$ is contained therein and the crystals are placed in water, as compared to Analcime crystals the proportion of Analcime metal ions is comprised of sodium ions.

10. Analcime crystals according to claim 9 wherein the cations comprise lithium or potassium ions.

11. Analcime crystals according to claim 9 wherein the cations comprise cobalt ions.

12. A method for immobilization of a water material selected from the group consisting of water ($H_2O$), deuterium oxide ($D_2O$), tritium oxide ($T_2O$), or mixtures thereof, which method comprises absorbing said water material into Analcime crystals having their largest dimension in excess of 106 microns and including a fraction of Analcime crystals of largest dimension between 106 and 125 microns, or into a body wherein the Analcime crystals having their largest dimension in excess of 106 microns and including a fraction of Analcime crystals of largest dimension between 106 and 125 microns are embedded in a water-porous binder matrix, wherein the Analcime crystals of largest dimension between 106 and 125 microns, when containing $T_2O$ and placed in water, have a half-life of exchange of the $T_2O$ with the water of about 167 years.

13. A method for immobilization of a water material selected from the group consisting of water ($H_2O$), deuterium oxide ($D_2O$), tritium oxide ($T_2O$), or mixtures thereof, which method comprises absorbing said water material into Analcime crystals having their largest dimension greater than 106 microns and being substantially free of porous regions.

14. The method according to claim 13 wherein the Analcime crystals of largest dimension between 106 and 125 microns, when containing $T_2O$ and placed in water, have a half-life of exchange of the $T_2O$ with the water of about 167 years.

15. The method according to claim 12 or 13 wherein the Analcime crystals each have their largest dimension in the range 106–150 microns.

16. The method according to claim 12 or 13 wherein the Analcime crystals are mixed with said water material and then heated to 150°–200° C. under said material's autogenous vapor pressure.

17. The method according to claim 12 or 13 wherein said water material consists of tritium oxide ($T_2O$) or a mixture of water ($H_2O$, and/or deuterium oxide ($D_2O$) with tritium oxide ($T_2O$).

* * * * *